United States Patent [19]
Yamaguchi

[11] Patent Number: 6,132,313
[45] Date of Patent: Oct. 17, 2000

[54] MANIPULATING DEVICE HAVING THREE DEGREE FREEDOM

[75] Inventor: Hiromitsu Yamaguchi, Kobe, Japan

[73] Assignee: Konami Co., Ltd., Hyogo-Ken, Japan

[21] Appl. No.: 08/695,752

[22] Filed: Aug. 12, 1996

Related U.S. Application Data

[62] Division of application No. 08/364,910, Dec. 27, 1994, Pat. No. 5,583,407.

[30] Foreign Application Priority Data

Dec. 28, 1993 [JP] Japan ................................. 5-336678

[51] Int. Cl.$^7$ ........................................................ A63F 9/22
[52] U.S. Cl. .............................. 463/36; 345/156; 463/38
[58] Field of Search ................... 463/6, 7, 36, 38; 434/29, 30, 35, 45, 46, 62, 66, 71, 253; 446/7, 230, 21; 273/148 B; 318/551; 345/156

[56] References Cited

U.S. PATENT DOCUMENTS

| | | | |
|---|---|---|---|
| 3,560,629 | 2/1971 | Tucci | 84/1.27 |
| 4,461,470 | 7/1984 | Astroth et al. | 472/60 |
| 4,492,830 | 1/1985 | Kim | 463/38 |
| 4,748,441 | 5/1988 | Brzezinski | 463/38 |
| 5,049,079 | 9/1991 | Furtado et al. | 434/253 |
| 5,207,426 | 5/1993 | Inoue et al. | 463/36 |
| 5,329,276 | 7/1994 | Hirabayashi | 463/38 |
| 5,334,997 | 8/1994 | Scallon | 345/167 |
| 5,515,078 | 5/1996 | Greschler et al. | 463/36 |
| 5,552,807 | 9/1996 | Hayes et al. | 345/156 |
| 5,713,794 | 2/1998 | Shimojima et al. | 463/36 |

*Primary Examiner*—Jessica J. Harrison
*Attorney, Agent, or Firm*—Jordan and Hamburg LLP

[57] ABSTRACT

A manipulating foot pedal device is used for a video game machine or the like which is operable to provide a three-dimensional operation. The device includes a base member movable in a forward/backward direction relative; a rotatable member mounted on a top of the base member and rotatable about a first axis extending in a direction perpendicular to the forward/backward direction; a pivotal member mounted on a top of the rotatable member and pivotable about a second axis extending in a direction perpendicular to the first axis. The device further includes first, second, and third detectors operable to detect a moved amount of the base member, a rotated amount of the rotatable member, and a pivoted amount of the pivotal member.

23 Claims, 9 Drawing Sheets

FIG. 7D
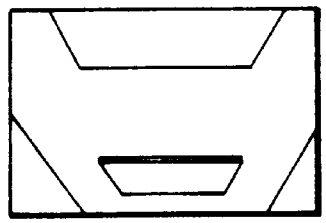
FIG. 7B  FIG. 7A  FIG. 7C
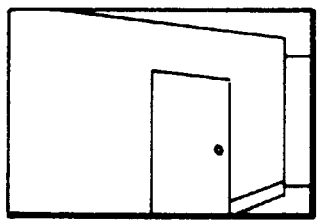 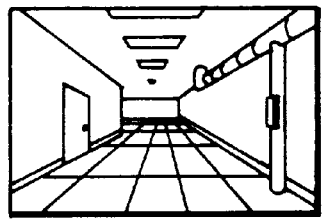 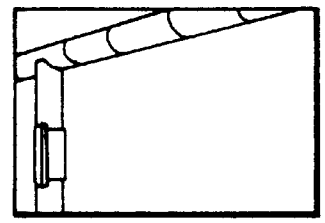
FIG. 7E
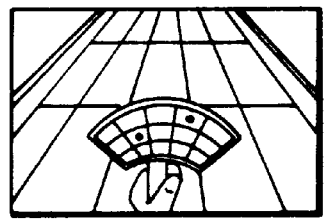

MANIPULATING DEVICE HAVING THREE DEGREE FREEDOM

This is a division, of application Ser. No. 08/364,910, filed Dec. 27, 1994, now U.S. Pat. No. 5,583,407.

BACKGROUND OF THE INVENTION

This invention relates to a manipulating device which is operated by an operator to designate specified operations and is particularly designed to realize operations of three degrees of freedom with a single manipulating device.

A foot pedal is known as a conventional manipulating member which is operated by a foot. The foot pedal is operable in a force exerting or push-in direction. An object to be operated is made to carry out a specified operation according to the detected push-in amount of the pedal.

However, the conventional foot pedal having only one degree of freedom, namely in the push-in direction, can designate the operations only insufficiently, thereby imposing a burden on the operator. However, it is not preferable to provide many manipulating members in terms of the number of parts, installation space and simple operation. Further, the provision of many manipulating members makes the system complicated and large-size.

SUMMARY OF THE INVENTION

It is an object of the present invention to provide a manipulating device which has overcome the problems residing in prior art.

It is another object of the present invention to provide a manipulating device which has three degrees of freedom, i.e., moves along a forward/backward direction, rotates sideways and pivots along a push-in direction, and is capable of designating three kinds of operation with a single manipulating device.

A manipulating device of the present invention is used with an apparatus which is capable of executing an operation in accordance with a movement of the manipulating device. The device comprises a base member movable in a forward/backward direction relative to the apparatus; a rotatable member mounted on a top or the base member and rotatable about a first axis extending in a direction perpendicular to the forward/backward direction; a pivotal member mounted on a top of the rotatable member and pivotable about a second axis extending in a direction perpendicular to the first axis; a first detector operable to detect an amount of displacement of the base member in the forward/backward direction; a second detector operable to detect an amount of rotation of the rotatable member with respect to the base member; and a third detector operable to detect an amount of pivot of the pivotal member with respect to the rotatable member.

The base member may be formed with an engaging zone in a specified outside portion thereof. The first detector may be constructed by an engaging wheel meshable with the engaging zone, and a displacement sensor provided on the apparatus and operable to detect a displacement of the engaging wheel. The engaging zone may be a rack formed in the base member. The engaging wheel may be a gear wheel.

It may be appreciated to further provide a central shaft extending along the first axis, the central shaft rotatably mounted on the base member, and fixedly attached with the rotatable member. The second detector may be constructed by a wheel engageable with a specified periphery of the central shaft; and a displacement sensor provided on the base member and operable to detect a displacement of the wheel. The central shaft may be fixedly attached with a gear wheel at the specified periphery of the central shaft. The wheel of the second detector may be a gear wheel meshable with the gear wheel attached on the central shaft.

The pivotal member may be provided with a projecting member on a bottom surface thereof, the projecting member having an arcuate engaging surface coinciding with a circular arc whose center is on the second axis. The third detector may be constructed by a wheel engageable with the engaging surface of the projecting member, and a displacement sensor provided on the rotatable member and operable to detect a displacement of the wheel.

The engaging surface may be a rack formed in the projecting member, and the wheel of the third detector is a gear wheel meshable with the rack.

Also, It may be preferable to use a potentiometer as the displacement sensor.

Further, it may be appreciated that the pivotal member is in the form of a slipper capable of accommodating a foot of the human being.

With the manipulating device, the base member is movable along the forward/backward direction with respect to the apparatus and its moved amount is detected by the first detector. The rotatable member is provided on the top of the base member and its rotated amount with respect to the base member is detected by the second detector. The pivoted amount of the pivotal member with respect to the rotatable member is detected by the third detector.

Accordingly, the manipulating device is movable in the three directions, namely, movement of the device along the forward/backward direction, rotation thereof to the right and left and pivotal movement thereof (press-in direction). In other words, the manipulating device is given with three degrees of freedom. Thus, three different kinds of operatlons can be designated by a single manipulating device.

The first, second, and third detectors respectively include the displacement sensor provided on the apparatus. the displacement sensor provided on the base member, the displacement sensor provided on rotatable member. This will make it assured to detect their respective moved amounts independently from one another.

Each detector has the gear wheel engaging with the rack or gear wheel provided on the member to be detected. Accordingly, detection can be executed at a higher accuracy.

Also a potentiometer is used as the displacement sensor, which will reduce the costs of production.

These and other objects, features and advantages of the present invention will become more apparent upon a reading of the following detailed description and accompanying drawings.

BRIEF DESCRIPTION OF THE DRAWINGS

FIG. 3A showing a forward/backward movement of a base member.

FIG. 3B showing a pivotal movement of a pivotal member, and

FIG. 3C showing a rotating movement of the rotatable member;

FIGS. 7A to 7E show monitor images in the respective aiming direction or the beam gun, FIG. 7A showing a monitor image when the aiming direction is within an area A.

FIG. 7B showing a scrolling of the monitor image to the left,

FIG. 7C showing a scrolling of the monitor image to the right,

FIG. 7D showing a scrolling of the monitor image to the above, and

FIG. 7E showing a scrolling of the monitor image to the below; and

DETAILED DESCRIPTION OF THE PREFERRED EMBODIMENTS OF THE INVENTION

Figure 8:
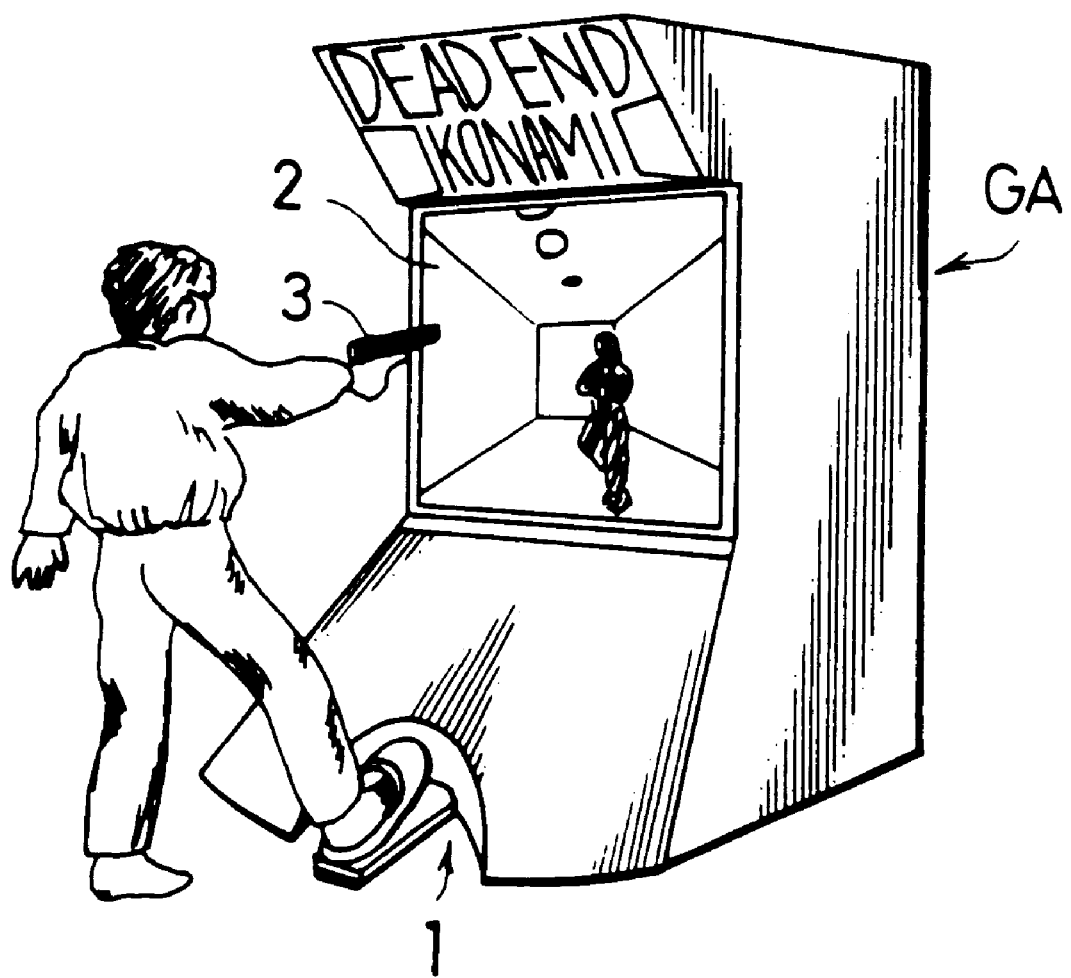
FIG. 8 is a perspective view showing a relationship between a game player and the video game machine incorporating the device of the present invention.

FIG. 8 is a perspective view exemplary showing a video game machine incorporating a manipulating device according to the invention. As shown in FIG. 8. the video game machine includes a manipulating device 1 of the invention which is disposed at the bottom end of a casing GA, a display device 2 for displaying contents of the game in the form of visual images, the display device 2 being provided on a front center surface of the casing GA, and a beam gun 3 for shooting predetermined characters displayed on the display device 2. A three-dimensional image processing is applied to images to be displayed on the display device 2 using a polygon model. The manipulating device 1 is in the form of a foot pedal.

Figure 9:
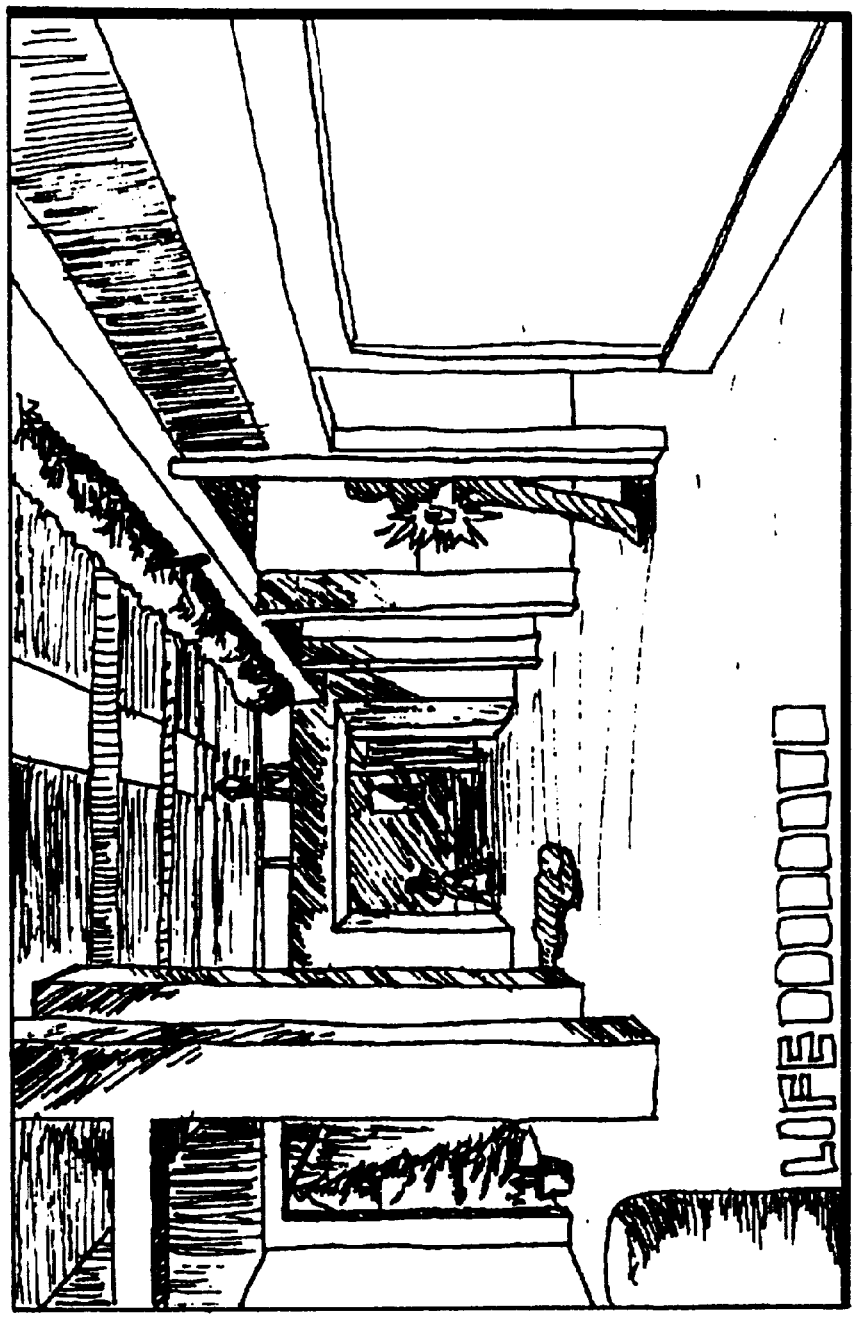
FIG. 9 is a diagram exemplary showing a monitor image three-dimenslonally displayed using a polygon model.

Specifically the image is processed to enable the player to see the image in a three-dimensional manner, for example, as illustrated in FIG. 9. The image display is controlled such that the image changes according to the movement of the foot pedal device 1 operated by the player.

The beam gun 3 includes, as already known, a photosensor 31 in its muzzle and a trigger 32. The photosensor detects horizontal emission lines of the display device 2, thereby detecting the aiming direction of the muzzle toward the display device 2. A trigger signal representing that the beam gun has been triggered by the trigger 32 is sent to a controller 4 (see FIG. 4) of the video game machine.

After receipt of the trigger signal, the controller 4 calculates a position determined by horizontal and vertical emission lines at a timing when the horizontal emission line is detected by the photosensor (count values of horizontal and vertical counters provided in the controller 4). It is discriminated whether the game character was shot based on the calculated position and the display position of the game character. In other words, the game character was shot if the calculated position coincides with the display position. Unless otherwise, the game character was missed. The shooting game progresses according to the discrimination result.

Figure 1:
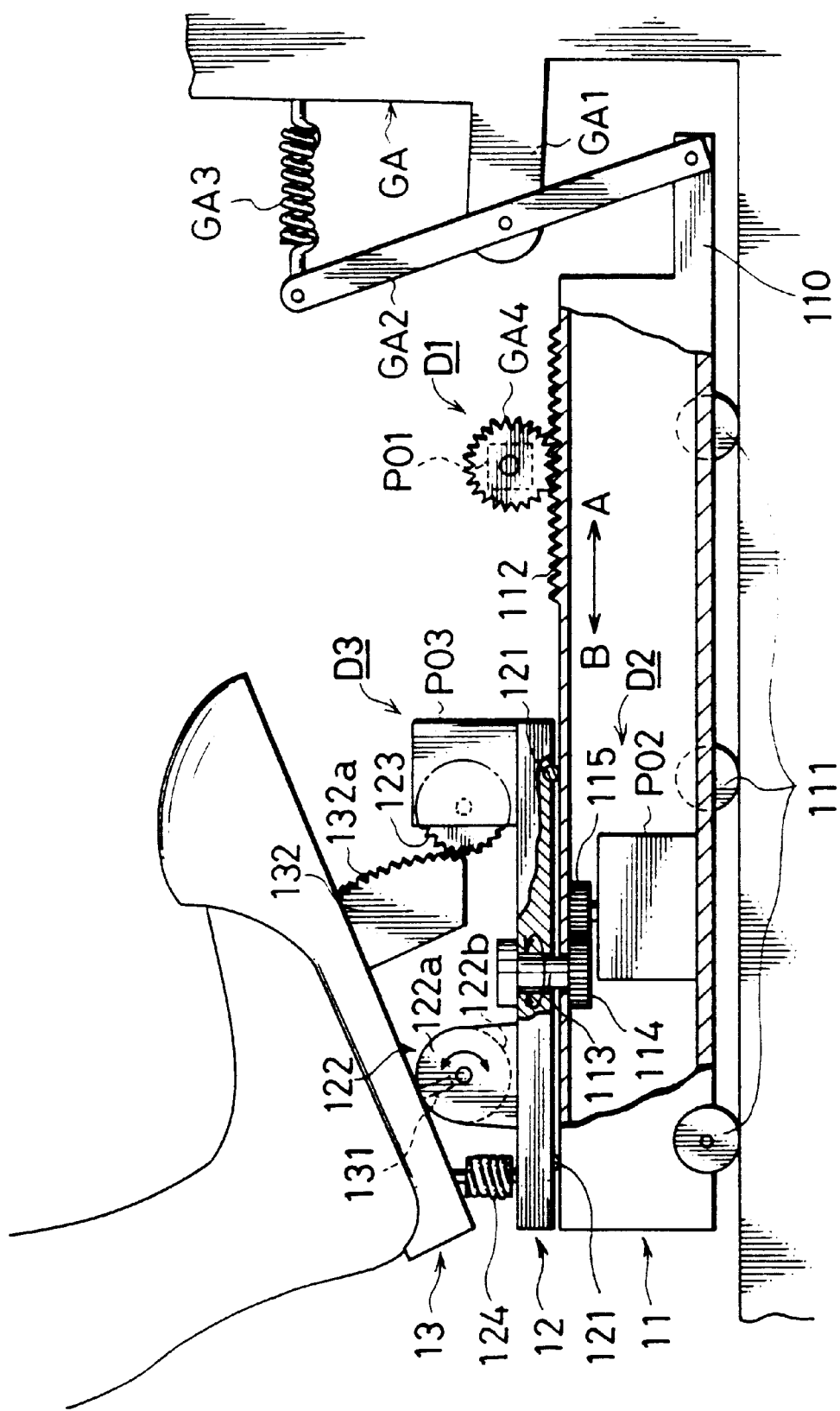
FIG. 1 is a side view showing a manipulating device according to the invention.

FIG. 1 is a partially cut away side view showing a construction of the manipulating foot pedal device according to the invention.

The foot pedal device 1 includes a base member 11, a rotatable member 12 and a pivotal member 13.

The base member 11 is in the form of a rectangular parallelepipeds and respective top, bottom, and side portions are made by plate members. Alternatively, the base member is made by an top opened container and a top plate member enclosing the opening. Inside the base member 11 is defined a hollow space. Pairs of tires 111 are mounted In three specified longitudinal positions at opposite sides of the bottom portion of the base member 11. i.e., in front, rear and middle longitudinal positions. Alternatively, a laterally long roller may rotatably be mounted in these specified longitudinal positions. A grip 110 extends from the front ends of the base member 11.

The casing GA of the video game machine is provided with a projection GA1 in such a position that the base member 11 can slide into the space below the projection GA1. An arm GA2 is mounted on the projection GA1 rotatably along a vertical plane. A spring GA3 is mounted between an upper end of the arm GA2 and the casing GA. A lower end of the arm GA2 is rotatably coupled with the grip 110 of the base member 11. Accordingly, the base member 11 in its released state stably remains in a specified position away from the casing GA.

A rack 112 having a specified length is formed at a top surface of the base member 11. In this embodiment, the rack 112 is formed at a front top surface of the base member 11.

The video game machine is also provided with a first detector D1 which includes a potentiometer PO1 and a driven member including a gear wheel GA4. The gear wheel GA4 is provided at a such a level that the gear wheel GA4 is meshable with the rack 112. The gear wheel GA4 is fixedly mounted on a transmission shaft extending in a direction normal to the forward/backward direction and parallel to the horizontal direction. The transmission shaft transmits a rotation of the gear wheel GA4 to the potentiometer PO1. The first detector D1 is adapted for detecting a moved amount of the base member 11 along the forward/backward direction. The potentiometer PO1 transduces a displacement (rotation) of the gear wheel GA4 to a voltage variation to indicate a moved amount of the base member 11.

The provision of the detector D1 on the casing GA has an advantage of obviating the need of considering the movement of wiring of a detector. It should be noted that the rack 112 may be formed on the casing GA and the first detector D1 may be provided on the base member 11.

A central shaft 113 extending in the vertical direction is rotatably mounted at a rear position of a top portion of the base member 11. The shaft 113 Is fixedly attached with the rotatable member 12 at the top end thereof while fixedly attached with a gear wheel 114 at the bottom end thereof. A second detector D2 for detecting a rotated amount of the rotatable member 12 is provided in the base member 11. The second detector D2 includes a gear wheel 115 and a potentiometer PO2. The gear wheel 115 is in mesh with the gear wheel 114 and connected with the potentiometer PO2 by way a transmission shaft extending in the vertical direction.

When the central shaft 113 rotates, similarly to the first detector D1, a voltage value corresponding to its rotated amount is output from the potentiometer PO2.

The rotatable member 12 is fixedly attached to the central shaft 114 substantially at its center in view of the weight balance. Further, a specified number of bearings 121 are mounted on the lower surface of the rotatable member 12 at a specified distance from the central shaft 113. A part of each bearing 121 projects downward from the lower surface of the rotatable member 12. The bearings 121 assure smooth rotation of the rotatable member 12 with respect to the base member 11.

Figure 2:
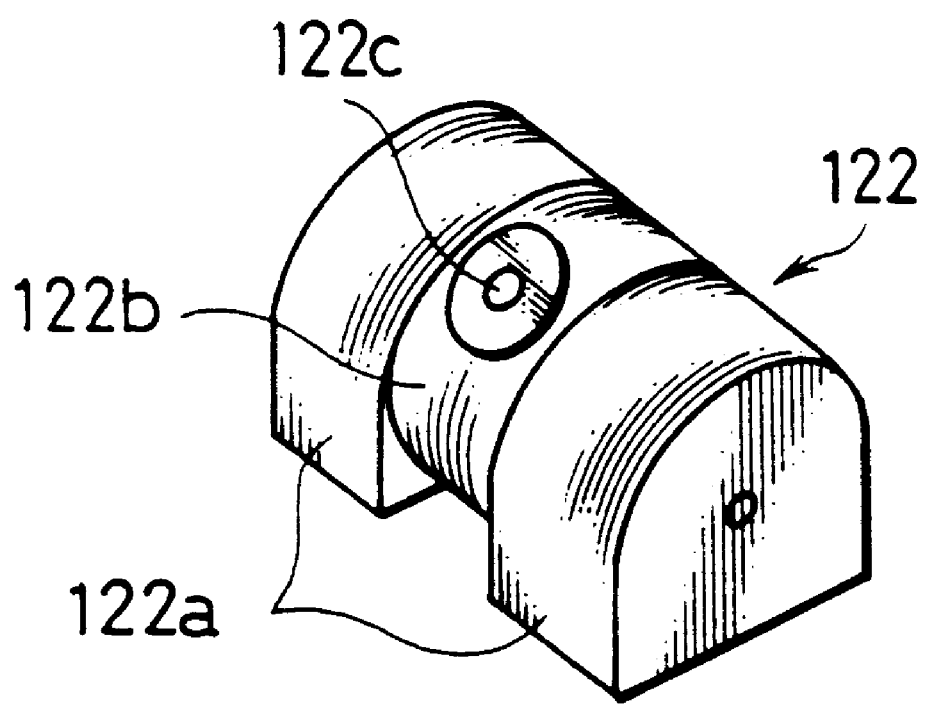
FIG. 2 is a perspective view showing a pivot block provided on a rotatable member of the device.

A pivot block 122 shown in FIG. 2 is secured at a position of a top surface of the rotatable member 12 slightly backward from its center. As shown in FIG. 2. the pivot block 122 includes two bearings 122a spaced apart by a specified distance and a shaft 122b rotatably mounted between these two bearings 122a. A coupling hole 122c which has a predetermined radius and is open in a radial direction of the shaft 122b is formed on the outer surface of the shaft 122b.

Further, a third detector D3 for detecting the pivoted amount of the pivotal member 13 is provided at a specified front position of the upper surface of the rotatable member 12. The third detector D3 includes a potentiometer PO3 and a gear wheel 123. The gear wheel 123 is mounted on a transmission shaft.

The gear wheel 123 is partially accommodated in the third detector D3. In other words, the gear wheel 123 is exposed from the side surfaces, at least front or rear side surface, of the potentiometer PO3. In this embodiment, the gear wheel 123 is exposed from the rear side surface. A spring 124 is mounted between the rear end of the upper surface of the rotatable member 12 and the lower surface or the pivotal member 13.

The pivotal member 13 is formed such that a foot of the player can easily be fitted in. For example, the pivotal member 13 is formed in the shape of a slipper. The pivotal member 13 is formed at a slightly rear position of its lower surface with a bar-like projection 131 which is inserted into the coupling hole 122c of the shaft 122b so as to incline or make a pivotal movement with respect to the rotatable member 12.

A projecting member 132 which is arcuate with respect to the center of rotation of the pivot block 122 projects from the lower surface of the pivotal member 13 at its front position. A rack 132a meshable with the gear wheel 123 of the third detector D3 is formed at front or outer arc of the projecting member 132. The spring 124 mounted between the rotatable member 12 and the pivotal member 13 not only acts to cushion a force exerted thereon, but also causes the pivotal member 13 to stop at its initial position in its released state. Accordingly, when the foot pivotal member 13 pivots, the projecting member 132 moves downward and rotates the gear wheel 123. Consequently, the potentiometer PO3 receives a displacement of the gear wheel 123 by way of the transmission shaft and then produces a voltage value corresponding to its inclination is output from the third detector D3.

Voltage values from the first to third detectors D1 to D3 are introduced to the controller 4 and used as data for changing the contents of the screen in specified manners, respectively.

In this embodiment, the potentiometers PO1 to PO3 are used to detect a displacement of their respective gear wheels. However, according to the present invention, other displacement sensors may be used as far as they can detect a positional displacement of the base, rotatable, or pivotal members 11, 12, or 13.

Figure 3A:
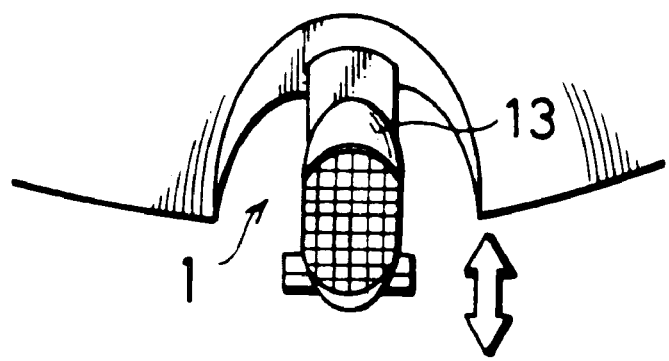
FIGS. 3A to 3C show movements of principal three members of the device.
Figure 3B:
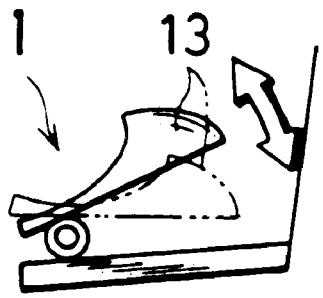
Figure 3C:
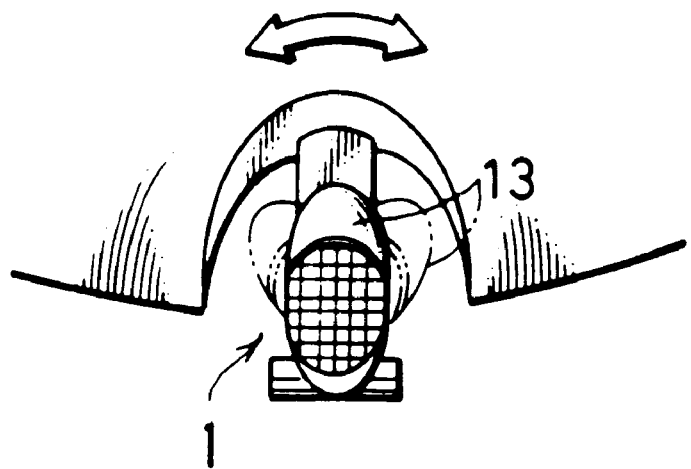

FIGS. 3A to 3B show movements of the three principal members of the foot pedal device, FIG. 3A showing a forward/backward movement of the base member, FIG. 3B a pivotal movement of the pivotal member, and FIG. 3C a rotating movement of the rotatable member.

When the base member 11 moves forward or backward as shown in FIG. 3A, the convergence of the 3-D image moves forward or backward along the depth direction of the screen. When the pivotal member 13 pivots as shown in FIG. 3B, the forward and backward moving speeds are changed according to its inclination. When the rotatable member 12 rotates sideways as shown in FIG. 3C, the forward and backward moving directions are changed according to its rotation.

Figure 6:
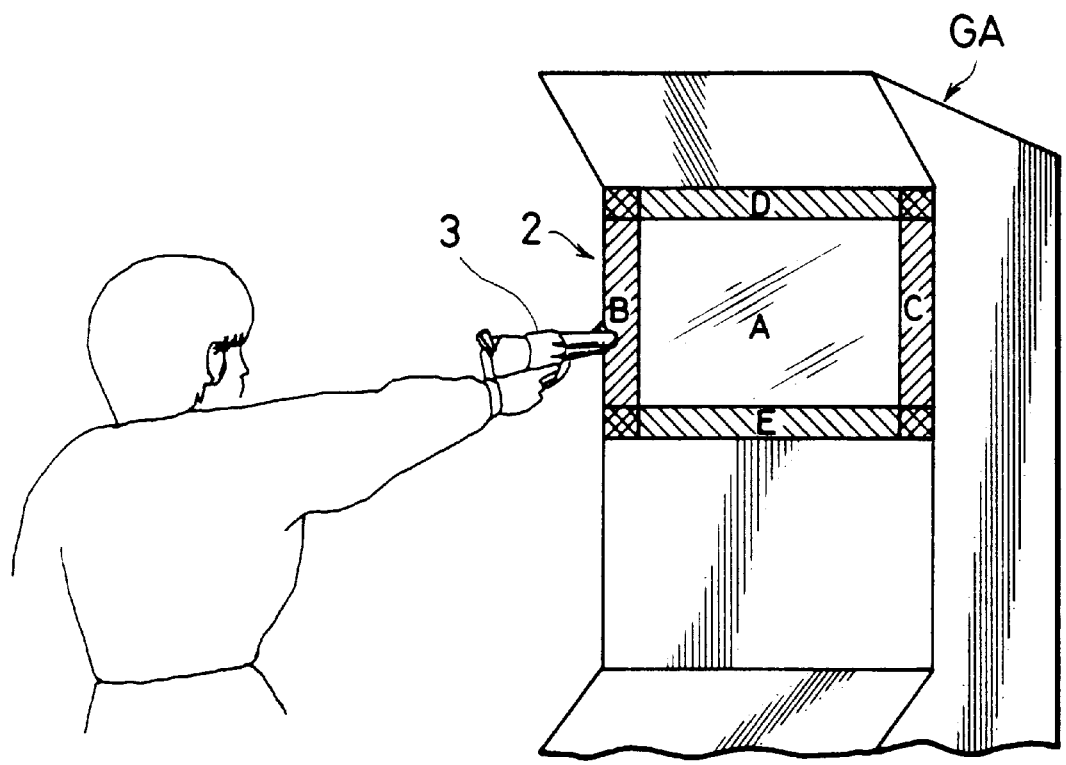
FIG. 6 is a diagram showing a relationship between an aiming direction of a beam gun used in the video game machine and image scrolling on a monitor screen of the game machine.

FIGS. 6 and 7 show a relationship between the aiming direction of the beam gun 3 and the image scrolling in the display device 2. As can be seen in FIG. 6, the aiming direction of the muzzle of the beam gun 3 is determined by the emission line detecting timing of the photosensor in the muzzle and the horizontal and vertical counters in the controller 4 in the casing GA. When the muzzle of the beam gun 3 is aimed at a specified position on the display device 2, the following image scrolling is performed. The display device 2 is divided into a plurality of areas; left, right, upper and lower end areas B, C, D and E and the remaining center area A. The controller 4 has position data of the respective areas as count values of the horizontal and vertical counters. When the beam gun 3 is detected to be aimed at any of the end areas, the image scrolling corresponding to the detected end area is performed at a predetermined scrolling speed as shown in FIGS. 7B to 7E.

For example, if the beam gun 3 is detected to be aimed at the end area B, the monitor image is scrolled to the left as shown in FIG. 7B. If the beam gun 3 is detected to be aimed at the end area C, the monitor image is scrolled to the right as shown in FIG. 7C. If the beam gun 3 is detected to be aimed at the end area D, the monitor image is scrolled upward as shown in FIG. 7D. If the beam gun 3 is detected to be aimed at the end area E, the monitor image is scrolled downward as shown in FIG. 7E.

Figure 4:
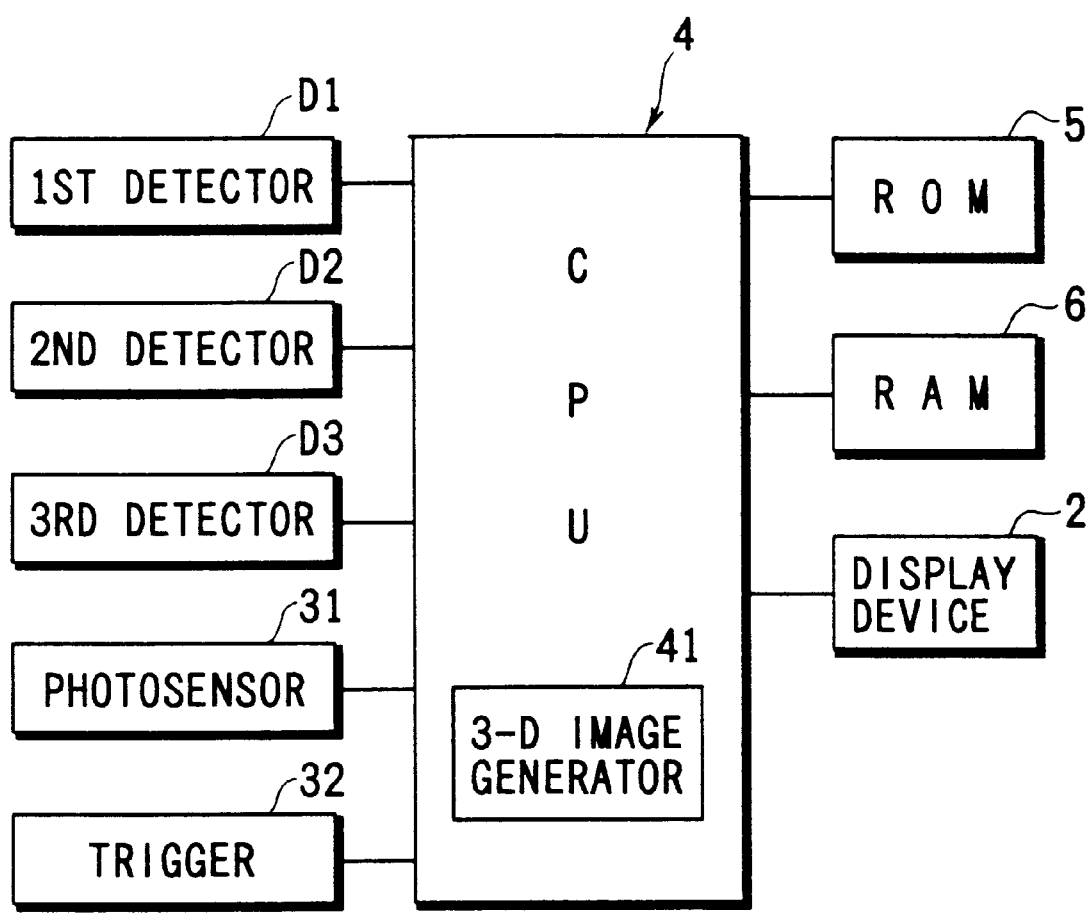
FIG. 4 is a block diagram showing a construction of a control system of a video game machine which incorporates the manipulating device of the present invention.

FIG. 4 is a block diagram of a control system of changing images in accordance with the operation of the manipulating foot pedal device 1 and carrying out the image scrolling in accordance with the operation of the beam gun.

The controller 4 includes, for example, a microcomputer provided with a ROM 5 for storing a game program, a RAM 6 for temporarily storing the processing data for the game, and a 3-D image generator 41.

The 3-D image generator 41 is adapted for generating a new image by calculating a position where the image is to be projected according to the operation of such manipulating members as the manipulating foot pedal device 1 and the beam gun 3 and a moved amount, inclination and magnification of the background image according to the scrolling.

Figure 5:
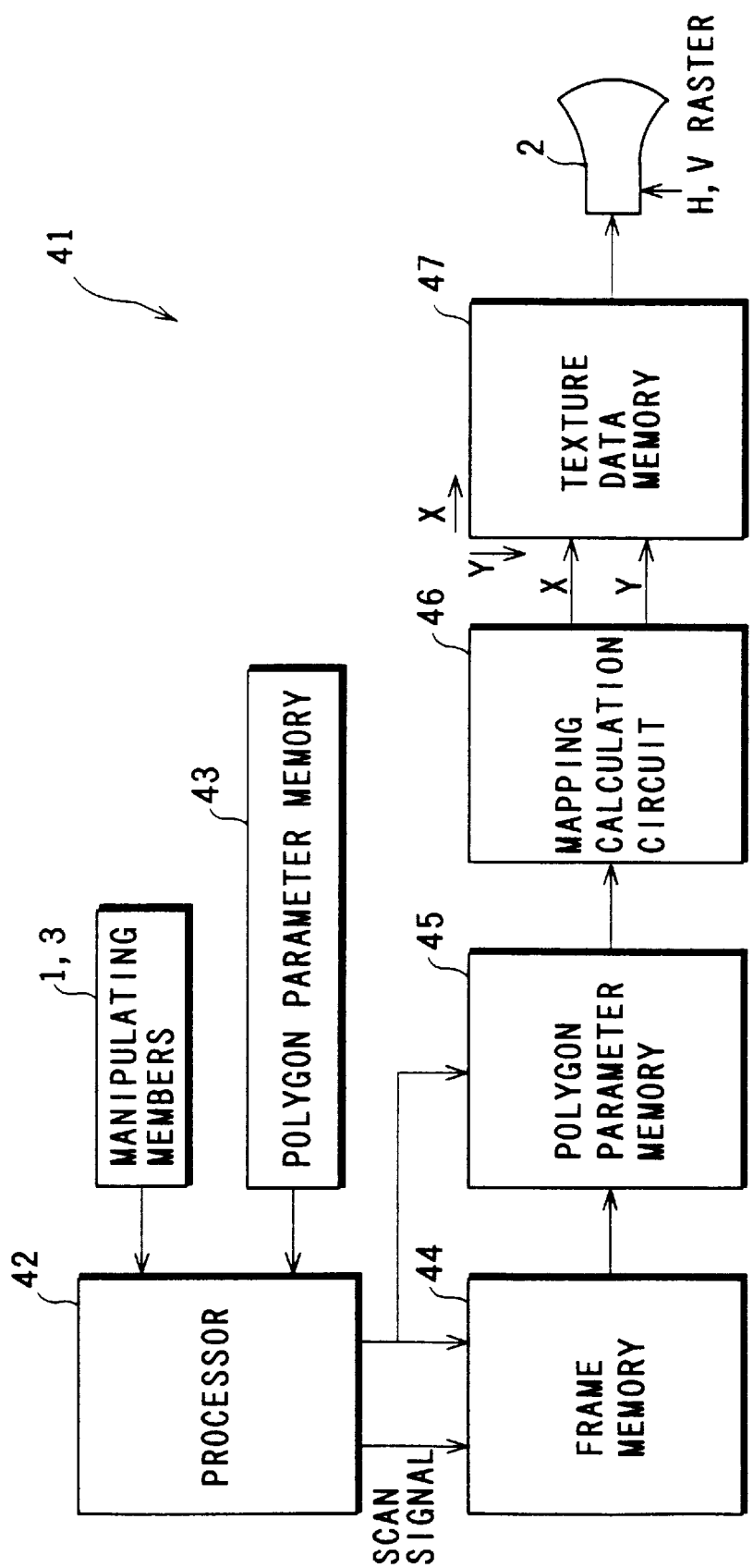
FIG. 5 is a block diagram showing a construction of a three-dimensional (3-D) image generator used in the video game machine.

The 3-D image generator 41 will be described with reference to FIG. 5. The 3-D image generator 41 includes a processor 42 is connected with a polygon parameter memory 43 for storing a number of polygon parameter defining each polygon, that is, information of a great number of polygon constituting objects in an image, e.g., passages, buildings, and characters. A polygon generally represents a surface unit of an object. In other words, the surface of an object is dissected into a number of polygons. The polygon parameter includes a surface number and a vertex coordinate which identify each polygon.

The processor 42 executes calculation of movement, rotation or inclination, and enlargement or contraction of each object based on the polygon parameters, game program, player's operational data input through the manipulating members 1 or 3 to generate new surface model data. The calculation includes modeling transformation, projection transformation, and other transformation which are wellknown.

Further, the processor 42 executes calculation of eliminating hidden surfaces of objects overlapped with each other from a specified viewing position in a virtual three-dimensional space.

Thus generated surface model data are sent to a frame memory 44 and a polygon parameter memory 45. The frame memory 44 has addresses corresponding to pixels (i.e. dots) of the display device 2 displaying a generated image, for example, first address corresponding to first dot. The frame memory 44 stores at each address a surface number of each polygon of the generated surface model. In other words, the frame memory 44 two-dimensionally represents the surface model by the surface numbers.

Respective parameters of the polygons are stored in a polygon parameter memory 45 in relation to the surface numbers stored in the frame memory 44. The polygon parameters define the new surface model. In other words, the polygon parameters represent a movement of an object, that is, displacement, rotation or inclination, or enlargement and contraction of polygons.

Progress of the game is controlled by the processor 42 or other processor dedicated to game operation in accordance with the game program stored in the ROM 5.

The processor 42 generates a scanning signal in synchronism with horizontal and vertical raster sweepings of the display device 2. In response to this scanning signal, the frame memory 44 sends out a surface number at each scanned address to the polygon parameter memory 45.

The polygon parameter memory 45 sends out the polygon parameter corresponding to the input surface number together with the surface number to a mapping calculation circuit 46. The mapping calculation circuit 46 executes calculation to map texture or draw an image on the basis of the sent surface numbers and polygon parameters.

indicated at 47 is a texture data memory storing texture data for each polygon, such as color, design and pattern to be mapped onto each polygon. In an X-Y matrix address arrangement.

The mapping calculation circuit 46 generates an (X, Y) address designating a necessary texture data from the texture data memory 47. The designated texture data is read from the texture data memory 47 in synchronism with horizontal and vertical raster sweeping signals and then sent to the display device 2. By repeating this operation with respect to each dot at high speed, a generated image is displayed on the display device 2.

When the base member 11 is moved forward, the image is moved so that the convergence moves along the depth direction of the screen according to the movement of the base member 11. When the rotatable member 12 is rotated sideways, the moving direction of the image is changed by an angle corresponding to the rotation of the rotatable member 12. When the pivotal member 13 is pushed, the image is moved along the depth direction of the screen at a speed corresponding to the inclination of the pivotal member 13.

When it is detected that the beam gun 3 is aimed at any one of the end areas B to E, the image is scrolled in the direction corresponding to the aimed area during such detection.

The foregoing embodiment has been described with reference to a foot pedal type manipulator which is operated by a foot of the human being. However, it should be noted that the present invention will be applicable for other type manipulators, e.g., a manipulator to be operated by a hand of the human being.

Application of the inventive manipulating device 1 having three degrees of freedom to video game machines, particularly to those which display images in a three-dimensional manner, enables the player to easily manipulate movements of the character corresponding to him. Its application to virtual reality will bring about more remarkable effect.

As described above, the inventive manipulating device is provided with the base member 11 movable along the forward/backward direction with respect to the game machine GA to which the device 1 is attached, the rotatable member 12 rotatably mounted on the top of the base member 11, and the pivotal member 13 mounted on the top of the rotatable member 12 and pivotal with respect to the rotatable member 12.

Further, there are provided the first detector D1 for detecting a moved amount of the base member 11 along the forward/backward direction, the second detector D2 for detecting a rotated amount of the rotatable member 12 with respect to the base member 11, and the third detector D3 for detecting inclination of the pivotal member 13 with respect to the rotatable member 12. Accordingly, the manipulating device is allowed to have three degrees of freedom, namely movement of the device along the forward/backward direction, rotation thereof to the right and left and pivotal movement thereof (press-in direction). Thus, operating of a single manipulating device will designate three different kinds of operations.

Further, since the potentiometer PO1 to PO3 are used for the respective detectors, a displacement of each member to be operated can be easily detected.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A gaming machine played by a game player comprising:
   a display;
   a foot pedal unit disposed in a main body of the gaming machine and movable by the game player in at least a horizontal plane and a vertical plane;
   a display controller for displaying an image in a three dimensional manner on a screen to generate a game space and for changing a monitor image on the screen of the display in response to the movement of the foot pedal unit;
   said foot pedal unit comprising:
      a base member movable in a forward and backward direction by the game player with respect to the machine;
      a rotatable member mounted on top of the base member and rotatable by the game player about the base member;
      a foot pedal part disposed on a top of the rotatable member and capable of being inclined by the game player about the rotatable member;
      a first detector operable to detect an amount of movement of the base member in the forward and backward direction;

a second detector operable to detect an amount of rotation of the rotatable member with respect to the base member; and a third detector operable to detect an amount of inclination of the foot pedal part with respect to the rotatable member.

2. A gaming machine as defined in claim 1, wherein the first detector includes a rack formed on one of the surfaces of the base member excluding its front and rear surfaces and a gear attachable to the main body of the machine and meshable with the rack and a potentiometer with a rotating shaft which is connected to the gear.

3. A gaming machine as defined in claim 1 wherein the base member is rotatably connected with the rotatable member by a connecting shaft and the second detector includes a potentiometer with a rotational shaft connected with the connecting shaft.

4. A gaming machine as defined in claim 1, wherein the third detector includes a rack formed on an arc shaped arm having a radius of curvature with a center coinciding with an inclination center of the foot pedal, a gear wheel meshable with the rack, and a potentiometer with a rotational axis connected with the gear wheel and the rack is either disposed on the foot pedal or the rotational member and the gear wheel and the potentiometer are disposed on either one of the rotational member or the foot pedal.

5. A gaming machine as defined in claim 1, wherein the third detector includes a rack formed on an arc shaped arm formed on said rotational member, a gear wheel meshable with the rack, and a potentiometer with a rotational axis connected with the gear wheel, said gear wheel and potentiometer being mounted on said foot member.

6. A gaming machine played by a game player comprising:

a beam gun with a sensor therein;

a display device;

a foot pedal disposed on a main body of the machine and movable by the game player in at least in a horizontal plane and in a vertical plane;

a display controller for displaying a background and a target character in a three dimensional manner on a screen to generate a game space a changing monitor image in the game space in response to movement of the foot pedal by the game player; and a game progress controller for proceeding a game according to a result of a judgment if an aimed position of the beam gun on the screen detected by the sensor at the time the beam gun's trigger is pulled coincides with a position of the character image displayed on the screen.

7. A gaming machine as define in claim 6, wherein the foot pedal includes:

a base member movable in a forward and backward direction with respect to the machine;

a rotatable member mounted on a top of the base member and rotatable with respect to the base member;

a foot member disposed on top of the rotatable member and capable of being inclined about the rotatable member;

a first detector operable to detect an amount of displacement of the base member in the forward and backward direction;

a second detector operable to detect an amount of rotation of the rotatable member about the base member; and a third detector operable to detect an amount of inclination of the foot member with respect to the rotatable member.

8. A gaming machine as defined in claim 6, wherein the first detector includes a rack formed on one of the surfaces of the base member excluding its front and rear surfaces and a gear wheel attachable onto the main body of the machine and meshable with the rack and a potentiometer with a rotating shaft which is connected to the gear.

9. A gaming machine as defined in claim 6, wherein the base member is rotatably connected with the rotatable member by a connecting shaft and the second detector includes a potentiometer with a rotational shaft connected with the connecting shaft.

10. A gaming machine as defined in claim 6, wherein the third detector includes a rack formed on an arc shaped arm extending from the foot member, a gear wheel meshable with the rack, and a potentiometer with a rotational axis connected with the gear wheel, the gear wheel and the potentiometer being disposed on the rotational member or the foot pedal.

11. A gaming machine as defined in claim 6, herein the third detector includes a rack formed on an arc shaped arm formed on said rotational member, a gear wheel meshable with the rack, and a potentiometer with a rotational axis connected with the gear wheel, said gear wheel and potentiometer being mounted on said foot member.

12. A foot pedal device interactive with a gaming machine comprising:

a foot pedal means movably manipulative by a person's foot in at least two rotatable directions and at least one linear direction;

a plurality of detector means operable to detect the respective movement of said foot pedal means in each of said plurality of directions, each of said plurality of detection means having an output; and a gaming machine apparatus having a controller including a screen for displaying a game image, said controller receiving said outputs from said plurality of detector means to thereby control the game image displayed on the screen, whereby movement of a person's foot in said plurality of directions controls the game image displayed on the screen.

13. A gaming machine adapted to be played by a player comprising:

a main body;

a manipulating means disposed on said main body and operable to be manipulated by a game player;

a display controller for displaying a three dimensional image on a screen to generate a game space and for changing the three dimensional image displayed on the screen in response to the manipulation of the manipulating means;

said manipulating means being operable by a game player in at least three different directions to change at least three different characteristics of the three dimensional image being displayed on said screen, said manipulating means being operable by a player's foot simultaneously in said at least three directions.

14. A gaming machine played by a game player comprising:

a main body;

a foot pedal disposed on the main body of the game machine, the foot pedal including:

a base member movable by the game player in a forward/backward direction relative to the machine;

a rotatable member mounted on a top of the base member and rotatable by the game player about a first axis extending in a direction perpendicular to the forward/backward direction, said rotatable member being movable with said base member in said forward/backward direction;

a pivotable member disposed on a top of the rotatable member and pivotable by the game player about a second axis extending in a direction perpendicular to the first axis, said pivotable member being rotatable with said rotatable member as said rotatable member rotates about said first axis;

a first detector operable to detect an amount of movement of the base member in the forward/backward direction;

a second detector operable to detect an amount of rotation of the rotatable member with respect to the base member; and a third detector operable to detect a amount of rotation of the pivotal member with respect to the rotatable member;

a display having a screen; and a display controller for displaying an image in a three dimensional manner on the screen to generate a game space and for changing a monitor image on the screen of the display in response to the movement of the pivotal member.

15. A gaming machine played by a game player comprising:

a beam gun with a sensor therein;

a display device;

a foot manipulating pedal disposed on a main body of the machine, the foot manipulating pedal including;
  a base member movable by the game player in a forward/backward direction relative to the machine;
  a rotatable member mounted on a top of the base member and rotatable by the game player about a first axis extending in a direction perpendicular to the forward/backward direction, said rotatable member being movable with said base member in said forward/backward direction;
  a pivotable member disposed on a top of the rotatable member and pivotable by the game player about a second axis extending in a direction perpendicular to the first axis, said pivotable member being rotatable with said rotatable member as said rotatable member rotates about said first axis;
  a first detector operable to detect an amount of movement of the base member in the forward/backward direction;
  a second detector operable to detect an amount of rotation of the rotatable member with respect to the base member; and
  a third detector operable to detect an amount of rotation of the pivotal member with respect to the rotatable member;

a display controller for displaying a background and a target character in a three dimensional manner on a screen to generate a game space and changing monitor image in the game space in response to movement of the pivotable member; and a game progress controller for processing a game according to a result of a judgment of an aimed position of the beam gun on the screen detected by the sensor at the time the beam gun's trigger is pulled coincides with a position of the target character image displayed on the screen.

16. A foot pedal device interative with a gaming machine comprising:

a foot pedal means movably manipulative by a person's foot in at least two rotation al directions and at least one linear direction, the two rotational directions being about a first axis and a second axis respectively, the first axis being perpendicular to the second axis and the second axis being perpendicular to the one linear direction;

a plurality of detector means operable to detect the respective movement of said foot pedal means in each of said plurality of directions, each of said plurality of detector means having an output; and a gaming machine apparatus having a controller receiving said outputs from said plurality of detector means to thereby provide an interactive relationship between said gaming machine apparatus and said foot pedal means as said foot pedal means is movably manipulated by a person's foot in said plurality of directions.

17. A gaming machine played by a game player comprising:

a main body;

a display device having a plurality of display areas on a screen;

a display controller for displaying a background and a target character in a three dimensional manner on the screen;

a beam gun operable to be aimed by the game player at one of said plurality of display areas on said screen to thereby select a desired display area, said display controller being operable to effect image scrolling of said selected display area on said screen;

a movable mechanism disposed on said main body and movable by a game player;

said movable mechanism being movable by the game player in at least three directions to change at least three different characteristics of the image scrolling on the selected display area on said screen.

18. A gaming machine according to claim 17 wherein said movable mechanism is movable by the game player in one direction to move the displayed image along the depth direction of the screen, said movable mechanism being movable by the game player in another direction to change the moving direction of the image displayed on the screen, said movable mechanism being movable in a further direction to change the speed at which the displayed image is moved along the depth direction of the screen.

19. A gaming machine according to claim 18 wherein said beam gun includes a trigger device operated by the game player, the selected image being scrolled on the display area on said screen including a target, said display controller discriminating whether the beam gun aimed by the game player coincides with the target when said trigger device is operated by the game player.

20. A gaming machine adapted to be played by a player comprising:

a main body;

a manipulating means disposed on said main body and operable to be manipulated by a game player, said manipulating means being operable by a player's foot separably in any one of said at least three different directions;

a display controller for displaying a three dimensional image on a screen to generate a game space and for changing the three dimensional image displayed on the screen in response to the manipulation of the manipulating means;

said manipulating means being operable by a game player in at least three different directions to change at least three different characteristics of the three dimensional image being displayed on said screen.

21. A gaming machine adapted to be played by a player comprising:

a main body;

a manipulating means disposed on said main body and operable to be manipulated by a game player;

a display controller for displaying a three dimensional image on a screen to generate a game space and for changing the three dimensional image displayed on the screen in response to the manipulation of the manipulating means;

said manipulating means being operable by a game player in at least three different directions to change at least three different characteristics of the three dimensional image being displayed on said screen;

said manipulating means including a first control means operable to control the forward and backward movement of the three dimensional image along the depth direction of the screen;

said manipulating means includes a second control means operable to control the speed of the forward and backward movement of the three dimensional image along the depth direction of the screen;

said manipulating means including third control means operable to change the direction of the forward and backward movement of the three dimensional image along the depth direction of the screen;

said first control means including a base member movable in a forward and backward direction with respect to the machine to control the forward and backward movement of the three dimensional image.

22. A gaming machine as defined in claim 21, wherein said second control means includes a rotatable member mounted on a top of the base member and rotatable relative to the base member to control the speed of the forward and backward movement of the three dimensional image along the depth direction of the screen.

23. A gaming machine as defined in claim 22 wherein said third control means includes a foot pedal disposed on said rotatable member and pivotable relative to the rotatable member to change the direction of the forward and backward movement of the three dimensional image.

* * * * *